Feb. 27, 1923.
R. T. LIGHTFOOT.
FILTER.
FILED AUG. 3, 1921.
1,446,573.
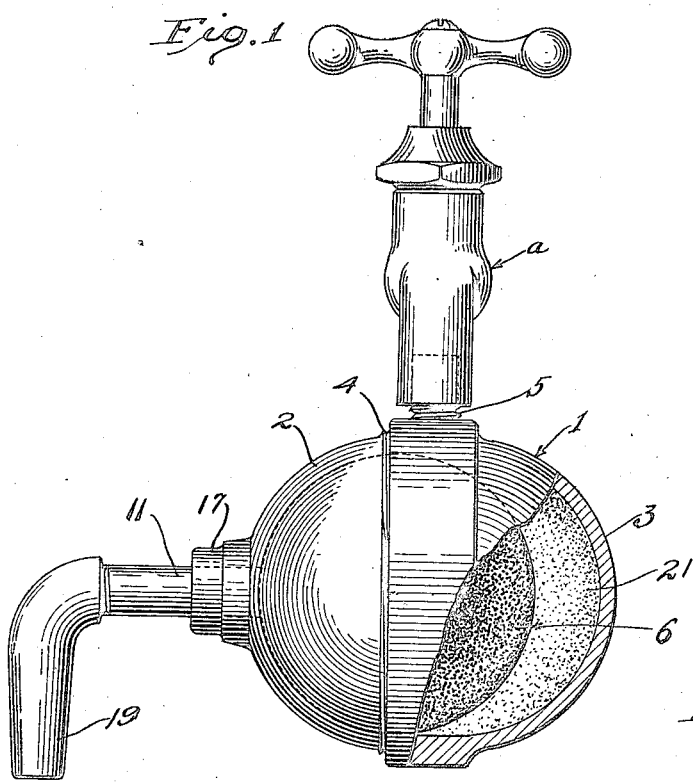
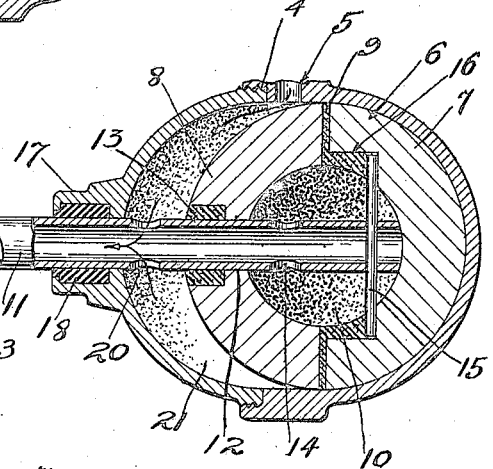
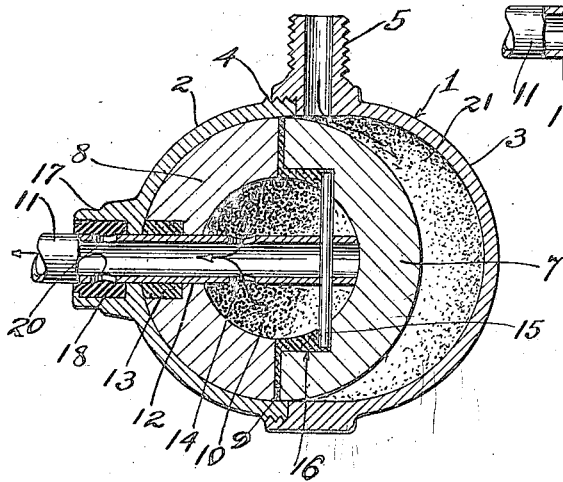
INVENTOR.
Richard T. Lightfoot
BY
ATTORNEY Patented Feb. 27, 1923.

1,446,573

UNITED STATES PATENT OFFICE.

RICHARD T. LIGHTFOOT, OF LOS ANGELES, CALIFORNIA.

FILTER.

Application filed August 3, 1921. Serial No. 489,426.

*To all whom it may concern:*

Be it known that I, RICHARD T. LIGHT-FOOT, a citizen of the United States, and a resident of Los Angeles, in the county of Los Angeles and State of California, have invented certain new and useful Improvements in Filters, of which the following is a specification.

This invention relates to means for filtering liquids, and refers more particularly to a filter which can be readily attached to the domestic faucet so that the water supplied through said faucet can be filtered before being used.

An object of the invention is to secure either filtered or unfiltered water, as desired.

Another object is to provide a device of this character which is convenient to use and keep clean.

Another object is to make provision for grinding or rubbing the entire outer face of the filtering element so as to clean sedimentary deposits from said face.

Another object is to provide for convenient flushing out of the impurities and powdered filtering material removed from the filtering element by the grinding operation.

This filter is an improvement on the filter embodied in my co-pending application, Serial No. 370,153, filed March 31, 1920, and a further object is to increase the available filtering area.

Another object, distinguishing from the device disclosed in my co-pending application mentioned above, is the simplification of the filter.

The accompanying drawings illustrate the invention:

Figure 1 is a front elevation, partly in section, of a filter embodying the invention, the same being shown in position on a faucet.

Figure 2 is a sectional elevation of the filter on a plane parallel with the plane of the drawing, the filtering element being shown in non-filtering position.

Figure 3 is a sectional elevation similar to Figure 2, excepting that the filtering element is shown in position for filtering the liquid.

There is provided a hollow body 1, the end portions of which are hemispherical in form. The body is of slightly greater diameter longitudinally than transversely, and comprises, in this instance, two separable sections 2, 3, connected by screw threads 4 or other suitable means. The section 3 is provided with a screw threaded nipple 5 for attachment to a faucet such as that indicated at *a* in Figure 1 of the drawings. Inside of the body 1 is a hollow spherical filtering element 6 formed, in the instance shown, of hemispherical chambered sections 7, 8. During the process of manufacturing the sections 7, 8 are firmly secured to each other by suitable means as, for example, cement indicated at 9. When the sections 7, 8 are assembled they form a spherical chamber 10 into which the liquid must pass after said liquid filters through the filtering element from the outside thereof.

The liquid issues from the chamber 10 through a tubular nozzle 11 which is inserted in an opening 12 in the filtering section 8 and is secured in said opening by cement 13. The nozzle 11 extends into the chamber 10 and communicates with said chamber through a port or ports 14. The nozzle 11 may be further secured in place in the filtering element by a pin 15 projecting transversely through the nozzle 11 and having its ends seated in recesses 16 formed in the filtering section 7. The cement 9 also extends into said recesses 16 so as to securely hold the pin 15 in place.

The nozzle 11 projects through a stuffing box gland 17 having an annular packing member 18 which surrounds the nozzle 11 and serves to insure against leakage of liquid past said nozzle. The outer end of the nozzle is preferably bent to form a downturned spout 19 which serves to direct the water or other filtered or unfiltered liquid into any vessel that may be placed beneath it. The nozzle 11 is also provided with a port or ports 20 positioned appropriately to communicate with the chamber 21 of the body 1 when the section 8 is spaced from the section 2, as in Figure 2. When the filtering section 7 is spaced sufficiently from the body section 3, the ports 20 register with the packing member 18, which thus also functions as a valve to close said ports. This position of the ports is illustrated in Figure 3.

The invention operates as follows: Assuming that the filter has just been installed, as shown in Figure 1, and that it is desired to draw unfiltered water, the nozzle 11 will be grasped and pushed inwardly as far as it will go, if it is not already in such position. This will open the ports 20, as in Figure 2, so as to permit liquid entering the chamber 21 from the faucet *a* to flow from said chamber through the nozzle 11 into any vessel placed to receive the liquid. The faucet will then be opened in the customary manner, and will be closed as soon as the desired amount of liquid has been drawn.

When it is desired to draw only filtered water, the nozzle 11 will be grasped and pulled outward as far as possible, as in Figure 3, to close the ports 20. The faucet will now be opened to admit the liquid to the chamber 21 rearward of the filtering element. When the filtering element is in this position it constitutes a ball valve and fits perfectly in the seat formed by the hemispherical inner face of the body section 2 so as to further insure against the possibility of any but filtered liquid discharging from the filter. The liquid thus admitted to the chamber 21, being under pressure, is forced through the wall of the filtering element into its chamber 10 from which it flows through ports 14 into the nozzle 11.

After the filter has been in use for a period of time, it is desirable to cleanse it so that the liquid will not filter too slowly. To clean, the filtering element will be moved into the two positions shown in Figures 2 and 3, and when in these positions the nozzle 11 will be turned so as to rotate the filtering element while it is in contact with the wall of the body 1. Sufficient pressure of the filtering element against the body 1 will be maintained by the operator to effect the desired trituration of the outer surface portions of the filtering element and whatever sedimentary deposits there may be associated therewith.

Two or three revolutions of the filtering element in the different positions will be ordinarily sufficient, and when the grinding operation is complete the filtering element will be moved to an intermediate position and the faucet opened so as to wash the debris from the chamber 21.

It will be clear from the foregoing description that the filter is of exceedingly simple construction, inexpensive to manufacture and not readily put out of order. It is also to be noted that the entire outer surface of the filtering element is available for filtering and that the spherical construction of said filtering element increases the filtering area for any given size of filter over that disclosed in my co-pending case.

I claim:

1. In a filter, the combination of a chamber reduced at both ends and having openings, a filtering element in the chamber of smaller size than said chamber adapted to closely fit the smaller portions of the chamber when moved toward the ends thereof, and means extending through one of the openings and operative to move the filtering element toward either end of the chamber and to turn said element to cause grinding thereof against the inner surfaces of the chamber.

2. In a filter, the combination of a chamber having a hemispherical end portion and having openings, a filtering element of smaller size than said chamber having a hemispherical portion to fit the hemispherical end of the chamber when moved theretoward, and means extending through one of the openings and operative to move the filtering element into contact with the hemispherical end.

3. In a filter, the combination of a chamber having hemispherical end portions and having openings, a filtering element of smaller size than said chamber having hemispherical portions to fit the hemispherical ends of the chamber when moved theretoward, and means extending through one of the openings and operative to move the filtering element toward either end of the chamber and to turn said element to cause grinding thereof against the inner surface of the chamber.

4. In a filter, the combination of a chamber having openings and having hemispherical end portions, an approximately spherical hollow filtering element in the chamber adapted to fit either end of the chamber, a nozzle having one end fixed to the filtering element and projecting into the recess thereof and extending through one of the openings of the chamber.

Signed at Los Angeles, California, this 26th day of July, 1921.

RICHARD T. LIGHTFOOT.